United States Patent [19]

Zondek

[11] 4,129,583

[45] Dec. 12, 1978

[54] PROCESS FOR SEPARATING CRYSTALLIZABLE FRACTIONS FROM MIXTURES THEREOF

[76] Inventor: Klaus Zondek, Callao 3385, Santiago, Chile

[21] Appl. No.: 871,964

[22] Filed: Jan. 24, 1978

Related U.S. Application Data

[63] Continuation of Ser. No. 686,807, May 17, 1976, abandoned, which is a continuation-in-part of Ser. No. 476,685, Jun. 5, 1974, abandoned, which is a continuation of Ser. No. 170,249, Sep. 8, 1971, abandoned.

[30] Foreign Application Priority Data

May 19, 1971 [AR] Argentina ............................. 235663

[51] Int. Cl.[2] .......................... C09F 5/10; C11B 3/00; C10G 43/06

[52] U.S. Cl. ................................ 260/428.5; 260/419; 208/35; 208/37; 208/38; 62/533; 62/534; 62/535

[58] Field of Search ............... 260/419, 428.5; 208/35, 208/37, 38; 62/533, 534, 535

[56] References Cited

U.S. PATENT DOCUMENTS

| | | | |
|---|---|---|---|
| 3,443,391 | 5/1969 | Storment et al. | 62/534 |
| 3,554,896 | 12/1971 | Bozeman et al. | 208/31 |
| 3,658,688 | 4/1972 | Biribaner | 208/31 |

FOREIGN PATENT DOCUMENTS

| | | | |
|---|---|---|---|
| 247630 | 10/1963 | Australia | 260/414 |

*Primary Examiner*—John Niebling
*Attorney, Agent, or Firm*—Robert E. Burns; Emmanuel J. Lobato; Bruce L. Adams

[57] ABSTRACT

In a continuous process for separating crystallizable organic components from mixtures thereof in solution, a feedstock of such components is mixed with at least one solvent therefor and the resulting feedstock mixture is continuously fed into a vessel in which a baffle defines a partially confined first zone and a partially confined second zone communicating with the first zone. At least one low-boiling point high-vapor pressure refrigerant is injected into the feedstock mixture in the first zone and evaporates and adiabatically expands therein to effect rapid cooling of the mixture to a selected low temperature and thereby form a slurry of microcrystals of components which are crystallizable down to the selected temperature. The resulting slurry is conducted to the second zone where it is contacted with warmer incoming feedstock mixtures to achieve an intermediate temperature at which crystals of lower melting point components melt and are redissolved while crystals of higher melting point components undergo crystal growth to form a slurry of larger crystals. The resulting slurry is withdrawn from the second zone and filtered to separate the crystals from the withdrawn slurry.

12 Claims, 1 Drawing Figure

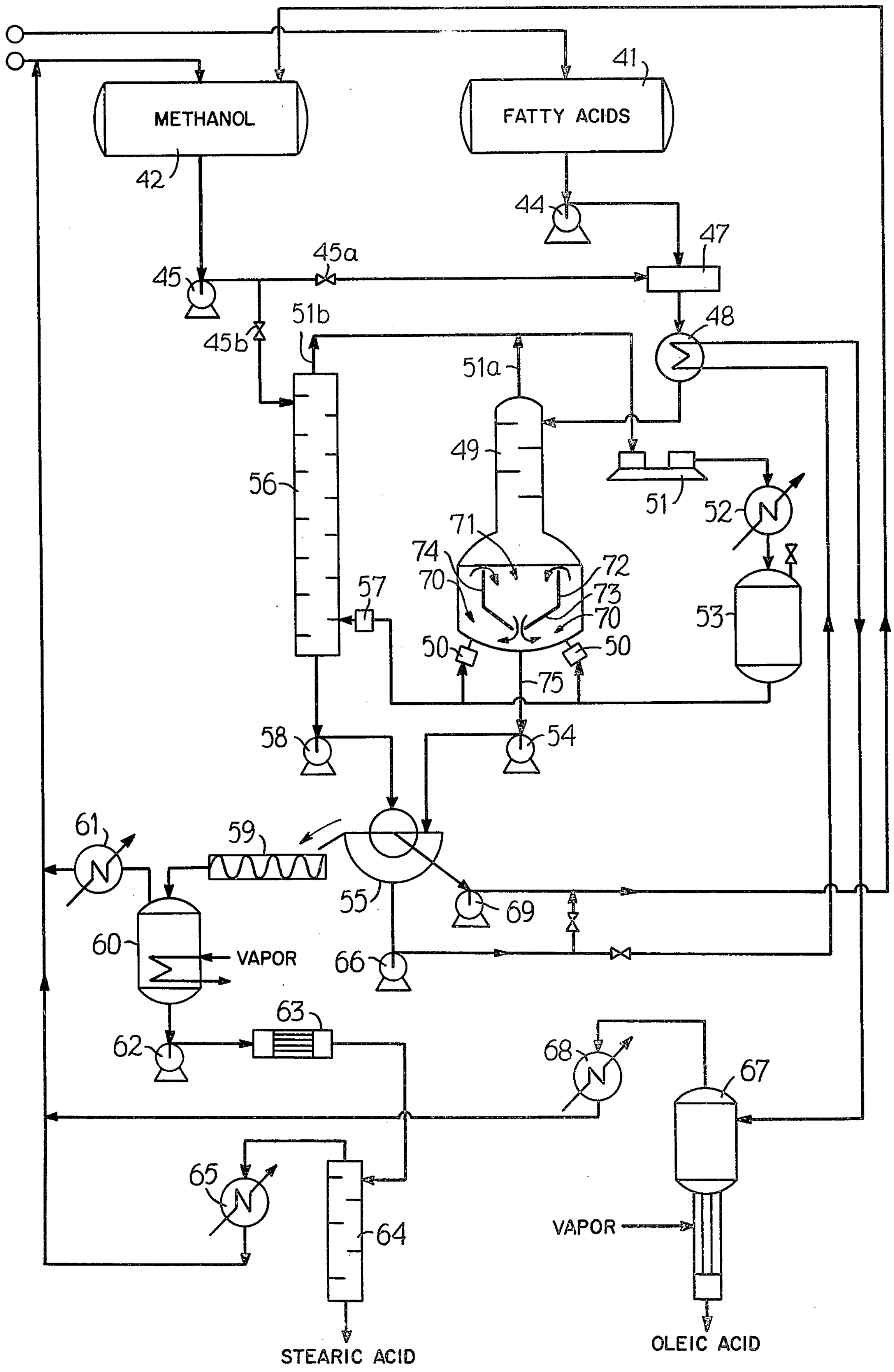
METHANOL
FATTY ACIDS
41
42
44
45
45a
45b
47
48
51b
51a
49
56
51
52
53
71
74
72
70
73
57
50
75
58
54
61
59
55
69
60
VAPOR
66
63
62
68
67
65
64
VAPOR
STEARIC ACID
OLEIC ACID

PROCESS FOR SEPARATING CRYSTALLIZABLE FRACTIONS FROM MIXTURES THEREOF

RELATED APPLICATIONS

This application is a Continuation of application Ser. No. 686,807 filed May 17, 1976 which is a Continuation-in-Part of application Ser. No. 476,685 filed June 5, 1974 which was a Continuation of application Ser. No. 170,249 filed Sept. 8, 1971 (all now abandoned).

FIELD OF THE INVENTION

This invention relates to separation processes for dissolved mixtures of crystallizable components and more particularly, it relates to the rapid freeze crystallization of the mixtures of such components followed by controlled crystal growth of the desired crystallized fraction and the separation of said fractions from the mixture.

BACKGROUND OF THE INVENTION

There exists a need for the separation of the individual fatty acids or their esters from their mixtures, naturally occurring or formed from naturally occurring sources such as fats and oils. Separation of waxes and similar crystalline fractions from mineral oils is also such a desirable separation. In addition, this process lends itself to the separation of crystallizable components of solutions of organic compounds from mutual solvents. The organic compounds are crystallizable and are separated by the characteristic crystal growth of the component of the mixture from the solvent mother liquor.

In the past, such separation has been achieved by the indirect cooling, as by heat exchangers, of the liquids containing the dissolved components to be separated. However, the indirect cooling procedures result in adherence of the crystallized components to the surfaces of the indirect cooling means, the heat exchanger elements. This gives rise to mechanical separating problems including the removal of the crystals from the cooling elements to which they adhere. Such separation usually is accomplished by mechanical scraping elements.

Further since indirect cooling is limited in cooling rate by the cooling apparatus and this limited cooling rate becomes compounded by the crystals adhering to the cooling surfaces, the types of crystals found on the cooled surfaces are of insufficient purity for other than gross separation procedures.

It has been proposed to cool the mixtures by direct cooling by the evaporation of refrigerant in the mixture by BOSMAN et al; U.S. Pat. No. 3,554,896. Evaporation of the refrigerant as taught therein results in a slow lowering of the temperature of the mixture. The slow rate required by this prior art teaching, 1.5° F./min, first forms crystals of the higher melting point components which are then gradually surrounded by the growth thereon of components of gradually lower melting points. As a result of the accretion of the lower melting components on the initial high melting crystals, crystal growth continues until the final crystals are of proper size for separation. However, the accreted material of lower melting point reduces the purity of the separated crystals.

THE INVENTION

The present invention is based upon the cooling of feedstocks containing the crystallizable components to be separated, which may or may not be premixed with solvents to form the initial feedstock. The cooling is accomplished by the injection and expansion into the feedstock mixture of a low-boiling, high-vapor pressure, liquid refrigerant. In the mixture areas adjacent to said injection of refrigerant a localized low-temperature zone is formed. Contained within this low-temperature zone is a slurry of microcrystal components which are crystallizable at temperatures down to the temperature of said low-temperature zone. This slurry of microcrystals is then contacted with warmer feedstock at temperatures above the low-temperature zone temperature. The area of said contact provides a zone of intermediate-temperature. In this intermediate-temperature zone, the lower melting components remelt and dissolve and the higher melting point crystals undergo crystal growth. As this crystal growth proceeds, the grown crystals are separated from the remaining mother liquor. It is thus possible to separate the higher melting components from the mixture from the lower melting components. The remaining lower melting components may be separated or recycled, recirculated and exposed to additional refrigerant and recrystallized at the next succeeding lower temperature stage at which the next lower fraction is crystallized. This fractional crystallization procedure may be continued until all of the crystallizable components of said feedstock are each separated and recovered.

Generally the feedstocks may comprise fats and oils which contain mixtures of fatty acids and esters thereof which are to be separated. Generally, when separating such fatty acid feedstocks, it is useful to dissolve the fatty acids in acetone or methylethyl ketone or mixtures thereof to ensure fluidity of the feedstock. The solvent mixture of acetone and methylethyl ketone is preferably in the range between 8:1 and 1:4. Such solvent mixtures are particularly useful for the separation of the naturally occurring fats and oils.

When the feedstock mixture consists of fatty acid mixtures it is preferred to have said fatty acids dissolved in an alkanol. The preferred solvent is methanol which is preferably used in a ratio between 1:1 and 1:4 of the liquid fatty acid.

When the material to be separated comprises waxes present in mineral oils, the preferred solvent comprises a mixture of toluene and methylethyl ketone in varying proportions ranging from 8:1 to 1:4. Light hydrocarbons may also be used.

Generally, when fats and oils are to be separated, the separate portions of such edible or industrial fats and oils refer not only to fats and oils as naturally derived but also to mixed components thereof including the polyglycerides in such oils and the esters of the fatty acids normally present which are artificially prepared by reacting the fatty acid with an alkane directly or other appropriate reactants which form crystallizable reaction products with said fatty acids.

Generally, the separable components of the fats and oils are their fatty acids, their alcohol esters including the methyl, or ethyl esters and the mono, di, or triglycerides thereof and any other chemical compounds thereof which may be separated by crystallization according to this invention.

The mineral oil feedstocks may be utilized as directly obtained or may be subject to various stripping or other operations for removing other valuable components and leaving behind a feedstock of the mineral oil base with its contained crystallizable waxes. The latter are separated by the process of this invention.

DETAILED DESCRIPTION

The FIGURE shows a schematic flow-diagram of the process of this invention.

The process will be described in conjunction with this flow-diagram for the separation of mixed fatty acids including stearic and oleic acids. Methanol is the exemplified solvent for the fatty acid and a fluorocarbon refrigerant (Freon) is the exemplified refrigerant.

The mixture of fatty acids, maintained in the liquid state at temperatures in the range 20°-50° C. is stored in tank 41 from which it is transferred by pump 44 to continuous mixer 47 where it is mixed with methanol transferred from tank 42 via pump 45 and valve 45$a$ to form the feedstock.

The methanol in tank 42 is either fresh methanol or recycled methanol derived from sources within the process as set forth below. The methanol to fatty acid ratio, in the range 1:1 to 4:1, provides the fatty acid feedstock solution at convenient pumping and feed viscosity for the subsequent steps. This proportion is not critical.

From feedstock mixer 47 the feedstock mixture is cooled in heat exchanger 48 by a filtrate from a later processing stage.

From heat exchanger 48, the cooled feedstock mixture is introduced at the top of contact column 49 where it flows downwardly in countercurrent contact with rising refrigerant vapors. The feedstock collects in liquid form in the bottom portion of contact column 49. Column 49 is provided at its upper portion with column packings or trays to insure good gas/liquid contact between the rising refrigerant vapors and the descending fatty acid/methanol feedstock mixture. The lower portion of contact column 49 is provided with an internal baffle member 72 centrally positioned below the surface of the collected descended liquid feedstock mixture. This baffle 72 may be any suitable shape but in the illustrated configuration comprises a conical baffle 73 with an attached cylindrical portion 74. This configuration is suitable for the indicated purpose.

Freon (du Pont), a commercial fluorinated hydrocarbon refrigerant, from tank 53 is expanded in expansion valves 50 and injected at the bottom of contact column 49, below the liquid level of the mixture. This injected and adiabatically expanded refrigerant thus causes a localized rapid cooling in the areas adjacent to refrigerant injection and expansion valves 50. These immediately adjacent areas form a low-temperature zone 70 along the bottom of contact column 49. These adjacent areas are cooled to temperatures as low as −40° C. In this low temperature zone 70, the stearic acid is immediately crystallized to form microcrystals together with the microcrystals of other crystallizable fatty-acid mixture components to form a slurry of microcrystals of all the components of the feedstock mixture which crystallize down to such temperatures.

As a result of convection currents caused by the rising of the gaseous refrigerant injected into contact column 49 from valves 50 and the positioning of baffle 72, this microcrystalline slurry from zone 70 is contacted with the descending warmer feedstock adjacent to and within baffle 70. This contact area with the warmer feedstock provides a zone 71 of intermediate-temperature where the lower melting components remelt and dissolve and the higher melting crystals undergo crystal growth.

Microcrystals of the type initially formed in low temperature zone 70 are notoriously difficult to separate. However, crystals which have undergone crystal growth, as those which remain in intermediate zone 71, can easily be separated by conventional means. These grown crystals from intermediate zone 71 are removed from contact column 49 by collector 75 positioned within the lower conical portion 73 of the baffle 72.

The apex of conical portion 73 of baffle 72 is open to ensure proper convection of the feedstock down to the areas adjacent to the refrigerant injection forming low-temperature zone 70 and up and around and over the top of baffle 72 and down through the interior of baffle 72 through the intermediate zone 71, past the open apical portion to cold zone 70 adjacent to refrigerant injection valves 50.

The refrigerant vapors exiting contact column 49 via vapor line 51$a$ are recompressed by compressor 51 and then condensed to liquid form by condenser 52. The resulting liquidified refrigerant is then recycled to refrigerant tank 53 form which it originated. From tank 53 it is then returned to contact column 49 or utilized elsewhere as detailed below.

The grown crystals in the cooled methanol mixture, removed from intermediate zone 71 via collector 75, are then transferred by pump 54 to filter 55 where the grown crystals of crystallized stearic acid are separated from the methanolic solution containing oleic acid and other redissolved components remaining from the initial fatty-acid feedstock mixture. The crystallized stearic acid is washed on filter 55 with cold methanol from column 56 supplied by pump 58. Column 56 is a cooling column wherein methanol from tank 42 is introduced at the top of column 56 and cooled by injection of refrigerant from tank 53 injected via expansion valve 57 at the bottom of column 56 cools the methanol used for washing. After washing the stearic acid on filter 55, the wash-methanol, depending upon the amount of impurities, may either be combined with the filtrate from filter 55 for subsequent removal of the contained oleic acid or it may be directly recycled directly to methanol storage tank 42 if of sufficient purity.

The refrigerant vapors from the top of column 56 are led via vapor line 51$b$ to compressor 51 and then to condensor 52 from where the liquid-phase refrigerant is returned to tank 53.

The separated and washed stearic acid crystals from filter 55 are transferred by conveyor 59 to still 60 where the stearic acid is melted and adherent methanol is removed. The methanol vapors from still 60 are condensed in condensor 61 and the condensed methanol is recycled to tank 42.

The molten stearic acid via pump 62 is transferred to heat exchanger 63 where any traces of methanol are stripped. These trace vapors are condensed in condensor 65 and also recycled to methanol storage tank 42. The stearic acid is cooled in column 64 and removed therefrom in pure form as a solid final product.

The filtrate from filter 55, oleic acid dissolved in methanol, is pumped by pump 66 to evaporator 67 through heat exchanger 48 where it is initially warmed and the feedstock for contact column 49 is precooled. The methanol is stripped from the oleic acid in evaporator 67. The methanol is cooled via condensor 68 and recycled to methanol storage tank 42. The oleic acid is removed from stripping evaporator 67 as a final product.

The invention has been described above by the separation of stearic acid from a mixture of free fatty acids including oleic acid. Such mixtures of free fatty acid are generally commercially derived from slaughterhouse fats and from vegetable and fish oil refineries. The procedure essentially as described is also suitable for the separation of industrial cystallizable esters from fats or oils. The fatty acids or esters separated thus may be from feedstocks derived from edible or industrial fats or oils or from mixtures of components thereof.

The feedstocks for the process of this invention may also consist of wax-containing mineral oils. The mineral oils can be dewaxed by the crystallizing process of this invention. In the case of dewaxing of mineral oils, the methanol is replaced by a solvent in which the waxes are soluble. Intermediate boiling hydrocarbons in the pentane to octane range and mixtures thereof are suitable solvents for such a separation. They replace the methanol in the process as exemplified. Chlorinated hydrocarbons may also be used.

The term "oils and fats" as used herein refers not only to fats and oils as naturally derived but also to mixed components thereof including the polyglycerides of such oils and the esters of fatty acids with normally contained or artifically prepared alcohols. As components of fats and oils are considered for example the fatty acids, their alcohol esters including methyl and ethyl esters, mono, di, or triglycerides and any other chemical compounds thereof which may be separated by crystallization.

For the refrigerant, any substance having a high vapor pressure and low boiling point, and high caloric equivalent of heat of vaporization may be used as long as it is inert to the feedstock mixture. Thus carbon dioxide and the low-boiling, hydrocarbons and halogenated hydrocarbons, such as chlorinated hydrocarbons and the Freons, may be used when dealing with fats, oils or fatty acids. In addition, as the mineral oils are inert to liquid ammonia, liquid ammonia may be used as a refrigerant for the dewaxing of mineral oils. However, as liquid ammonia may react with the fatty acids or, in the presence of small amounts of moisture, may hydrolize the fatty acid esters, it is unsuitable for the separation of the components of fats and oils.

Depending upon the materials to be separated, suitable refrigerants include propane, butane, chlorinated hydrocarbons including methyl and ethyl chloride as well as methylene chloride the fluorinated hydrocarbons such as the Freons or liquid nitrogen may also be named in addition to liquified carbon dioxide.

When the refrigerant is supplied in liquid form from tank 53, it is adibatically expanded upon injection into the contact column via the expansion valves. This adibatic expansion causes a rapid reduction in temperature within the localized low temperature zone 70, immediately adjacent to the site of the injection of the refrigerant. Within zone 70 there is formed a slurry of the microcrystals of the various components which are crystallizable at the temperatures down to the localized zone temperature. Due to convection within the lower portions of the contact column 49, which is encouraged by the shape and positioning of the baffles, the slurry is contacted with fresh and warmer feedstock descending from the upper portions of column 49. This contacting takes place in intermediate temperature zone 71. The temperature in zone 71 can be controlled by the rate of convection, the rate of introduction of feedstock and the amount of refrigerant being injected. At this intermediate temperature zone 71, equilibrated between the temperature of the crystalline components rising in the slurry and the temperature of the descending feedstock, those microcrystals having melting points up to that temperature i.e. the intermediate zone temperature, remelt and dissolve in the warmer feedstock. Those microcrystals having melting points above that temperature, undergo crystal growth because they are immersed in solution which is saturated with regard to the crystalline component at the intermediate temperature. The growth is caused by the components from the oversaturated feedstock crystallizing at the intermediate temperature. Thus crystal growth is effected at and about the optimum temperature for the specific individual crystallizable component to be separated i.e. either the specific fatty acids or the specific wax.

While the description has been limited to the separation of stearic acid from the other low melting fatty acids denominated as "oleic acid", other high melting fatty acids can be separated from this "oleic acid" fraction by suitably controlling and raising the temperature of the intermediate zone and recycling the methanolic oleic fraction in lieu of fresh feedstock.

The waxes from mineral oil can similarly be separated.

The process as described above need not be limited to the specific feedstocks but can be generally applied for the separation of crystalline components from their solutions. The process need not be limited to the use of the specified solvents as often the refrigerant may be used as the solvent. Thus all art-recognized equivalent materials for the unit operations are intended if they function within the ambit of the invention.

What I claim is:

1. A continuous process for separating crystallizable organic components selected from the group consisting of fats, fatty acids, glycerides thereof and waxes from mixtures thereof in solution which comprises the steps of:

(A) mixing a feedstock of said components with at least one organic solvent therefor, which is suitable for crystallization of desired components of said feedstock, (B) continuously feeding the resulting mixture of feedstock and solvent to a first partially confined zone, (C) continuously injecting at least one low-boiling high-vapor pressure liquid refrigerant into said mixture in said first zone and evaporating and adiabatically expanding said refrigerant in said first zone to cool said mixture in said first zone rapidly to a selected low temperature and thereby form within said first zone a slurry of microcrystals of components of said mixture which are crystallizable down to said selected low temperature, (D) withdrawing evaporated refrigerant from said first zone, (E) continuously flowing the resulting chilled slurry of microcrystals from said first zone to a second partially confined zone, (F) continuously contacting said chilled slurry of microcrystals in said second zone with incoming feedstock mixture at a temperature above that of said slurry to achieve an intermediate temperature in said second zone at which temperature crystals of lower melting point components melt and redissolve and crystals of high melting point components undergo crystal growth to form a slurry of larger crystals in said second zone, (G) continuously withdrawing a portion of the resulting slurry of larger crystals from said second zone, and (H) separating crystals from said withdrawn slurry.

2. A process according to claim 1, in which said flow of said chilled slurry from said first zone to said second zone is promoted by rising bubbles of evaporated refrigerant.

3. A process according to claim 2, in which incoming feedstock mixture passes through said second zone to said first zone and then as a chilled slurry returns to said second zone.

4. A process according to claim 3, in which said incoming feedstock mixture is contacted in counter current relation with said evaporated refrigerant being withdrawn from said first zone.

5. A process according to claim 1, in which said feedstock comprises a mixture of fatty acids and/or glycerides thereof and solvent.

6. A process according to claim 5, in which crystals separated from the withdrawn slurry by filtration and a portion of solvent from said filtration together with fatty acids and/or glyceride thereof dissolved therein is recirculated and mixed with said mixture of fatty acids and/or glyceride thereof to form additional feedstock.

7. A process according to claim 5, in which crystals of fatty acid and/or glyceride thereof after being separated from said withdrawn slurry are heated to remove residual solvent therefrom.

8. A process according to claim 5, in which solvent and fatty acid and/or glyceride thereof of lower melting point separated from crystals of said withdrawn slurry are subjected to a distillation process to separate said solvent from said fatty acid and/or glyceride thereof.

9. A process according to claim 5, in which said fatty acids and/or glycerides thereof are first mixed with a solvent selected from the group consisting of ketone, alcane and alkanol solvents.

10. A process according to claim 9, in which said refrigerant is selected from the group consisting of $CO_2$, hydrocarbons and halogenated hydrocarbons.

11. A process according to claim 1, in which said feedstock comprises wax-containing oil and a solvent.

12. A process according to claim 11, in which said refrigerant is liquid ammonia.

* * * * *